United States Patent
Kim et al.

(10) Patent No.: US 9,923,948 B2
(45) Date of Patent: Mar. 20, 2018

(54) METHOD OF ACQUIRING VEHICLE CONTENTS, METHOD OF DISPLAYING VEHICLE CONTENTS, SYSTEM FOR DISPLAYING VEHICLE CONTENTS, AND AUTOMOTIVE ELECTRONIC DEVICE

(71) Applicant: LG ELECTRONICS INC., Seoul (KR)

(72) Inventors: Jungwoo Kim, Seoul (KR); Mingoo Kim, Yongin (KR); Sungha Choi, Seoul (KR); Seungman Kim, Osan (KR); Kyunggeun Kim, Seongnam (KR)

(73) Assignee: LG ELECTRONICS INC., Seoul (KR)

( * ) Notice: Subject to any disclaimer, the term of this patent is extended or adjusted under 35 U.S.C. 154(b) by 807 days.

(21) Appl. No.: 13/846,258

(22) Filed: Mar. 18, 2013

(65) Prior Publication Data

US 2013/0268581 A1    Oct. 10, 2013

(30) Foreign Application Priority Data

Apr. 5, 2012  (KR) .................. 10-2012-0035736

(51) Int. Cl.
| | |
|---|---|
| *G06F 15/16* | (2006.01) |
| *G06F 7/00* | (2006.01) |
| *H04L 29/08* | (2006.01) |
| *B60K 37/06* | (2006.01) |

(52) U.S. Cl.
CPC .............. *H04L 67/02* (2013.01); *B60K 37/06* (2013.01); *B60K 2350/906* (2013.01)

(58) Field of Classification Search
CPC ................. G08G 1/096783; H04N 2201/3253
USPC ........................................................ 709/203
See application file for complete search history.

(56) References Cited

U.S. PATENT DOCUMENTS

| | | | |
|---|---|---|---|
| 7,236,857 B2 * | 6/2007 | Schnier .................. | B60K 35/00 701/1 |
| 2002/0130967 A1 * | 9/2002 | Sweetser ................. | G09F 21/04 348/383 |
| 2003/0125846 A1 * | 7/2003 | Yu ............................ | G08G 1/20 701/1 |
| 2008/0133133 A1 * | 6/2008 | Abels ...................... | G01C 21/26 701/469 |
| 2010/0007523 A1 * | 1/2010 | Hatav .................... | G01C 21/26 340/901 |
| 2010/0036609 A1 * | 2/2010 | Kang ..................... | G06Q 30/02 701/408 |
| 2010/0110314 A1 * | 5/2010 | Kusano .............. | G01C 21/3667 348/837 |
| 2010/0179717 A1 * | 7/2010 | Gilbert ................... | G07C 5/008 701/31.4 |

(Continued)

FOREIGN PATENT DOCUMENTS

| | | |
|---|---|---|
| EP | 2 402 202 A2 | 1/2012 |
| WO | WO 2010/057776 A1 | 5/2010 |

*Primary Examiner* — Kevin Bates
*Assistant Examiner* — Emad Siddiqi
(74) *Attorney, Agent, or Firm* — Birch, Stewart, Kolasch & Birch, LLP (57) ABSTRACT

Disclosed is a method of acquiring vehicle contents, the method including receiving contents from a service provision server, acquiring meta information on the received contents, and acquiring vehicle contents displayable on a web browser on the basis of the received contents and the acquired meta information.

12 Claims, 7 Drawing Sheets

(56) References Cited

U.S. PATENT DOCUMENTS

| | | | |
|---|---|---|---|
| 2011/0035098 A1* | 2/2011 | Goto | G01C 21/3626 |
| | | | 701/36 |
| 2011/0288724 A1* | 11/2011 | Falk | B60K 35/00 |
| | | | 701/36 |
| 2012/0162427 A1* | 6/2012 | Lynam | B60R 1/00 |
| | | | 348/148 |
| 2012/0306637 A1* | 12/2012 | McGough | B60K 37/06 |
| | | | 340/439 |

* cited by examiner

METHOD OF ACQUIRING VEHICLE CONTENTS, METHOD OF DISPLAYING VEHICLE CONTENTS, SYSTEM FOR DISPLAYING VEHICLE CONTENTS, AND AUTOMOTIVE ELECTRONIC DEVICE

CROSS-REFERENCE TO RELATED APPLICATION

Pursuant to 35 U.S.C. § 119(a), this application claims the benefit of earlier filing date and right of priority to Korean Application No. 10-2012-0035736, filed on Apr. 5, 2012, the contents of which is incorporated by reference herein in its entirety.

BACKGROUND OF THE INVENTION

1. Field of the Invention

The present disclosure relates to a method of acquiring vehicle contents based on a cloud service, and a method of displaying the vehicle contents, and particularly, to a automotive electronic device and a system for displaying vehicle contents employing the method 2. Background of the Invention Future vehicles equipped with multimedia systems and artificial intelligence are implemented using conversion technologies that incorporate electric, electronic and information communications technologies into vehicles so as to realize the vehicle as safe and comfort high-end mobile space, information communications technologies for developing vehicles into high-end information devices, and corresponding visible and invisible multimedia information technologies.

The development of multimedia technologies based on a vehicle network has led to the introduction of more comfortable and convenient vehicles providing customers with final infortainment.

Such evolution of vehicles is inevitably leading to the development of information transmission technologies for drivers.

Currently, a display device installed in a vehicle is the core of an HMI (human machine interface) that provide drivers with not just TV images but also useful information, such as car conditions, control upon convenience devices, navigation, telematics, and the like.

However, the product cycle of a head unit installed in a vehicle is generally similar to the product cycle of the vehicle. This is because it is difficult to update the hardware and software of the head unit and so the latest IT and CE technologies cannot be continuously used in the vehicle.

Several solutions for the above problem have been suggested as follows.

First, there is a method that allows a head unit to use an application of a smart phone. Here, a smart phone is connected to the head unit, a mobile application of the smart phone transmits application data to the head unit, and the head unit performs rendering upon the data.

However, this method is disadvantageous in that when an application is added to the smart phone, the head unit has to have a module implemented to receive, process and display data from the added application.

Another limitation of this method is that when an application transmits generic data for several cloud services to the head unit, data and UIs displayable by the head unit are limited.

Secondly, there is a method of using an open platform-based head unit. In this method, the head unit directly downloads an application (app) from an application store or the like.

This method, however, is disadvantageous in that a user, when updating the application, has to additionally perform the process of downloading and updating the application from the application store.

Thirdly, a method that allows a head unit to receive a cloud service via a web browser is suggested. Here, the head unit directly accesses a cloud service via a web browser.

However, the above method is limited in that contents that violate driving restrictions, the contents contained in a web service being currently provided, cannot be verified.

Moreover, no web service provides an HMI being applicable to vehicles.

Therefore, there is the need for a head unit capable of always maintaining the latest functionality and providing contents in compliance with local driving restrictions.

SUMMARY OF THE INVENTION

Therefore, this specification is intended to overcome the above problems.

In particular, an aspect of this specification is to provide an automotive electronic device that maintains up-to-date functionality and eliminating the need for further update.

Another aspect of this specification is to provide an automotive electronic device that provides contents complying with local driving restrictions.

Another aspect of this specification is to provide an automotive electronic device that can provide a UI suited to the features of each cloud service.

To achieve these and other advantages and in accordance with the purpose of this specification, as embodied and broadly described herein, a method of acquiring vehicle contents may include: receiving contents from a service provision server; acquiring meta information on the received contents; and acquiring vehicle contents displayable on a web browser on the basis of the received contents and the acquired meta information.

The receiving of the contents may include: receiving a request for contents from an automotive electronic device; transmitting the request for the contents to the service provision server; and receiving the requested contents from the service provision server.

The receiving of the contents may include receiving contents regarding a preset web service at predetermined time intervals.

The acquiring of the meta information may include receiving meta information regarding the received contents from the service provision server.

The meta information may include at least one of service information regarding a service type of the contents, page information regarding a webpage contained in the contents, or component information regarding components constituting the contents.

A method of displaying vehicle contents may include: receiving vehicle contents including contents and meta information regarding the contents; acquiring content restriction information; determining a displayable portion in the contents on the basis of at least one of the meta information, the content restriction information, or vehicle travel information; and displaying a region determined as the displayable portion in the contents.

The vehicle contents can be displayed on a web browser.

The meta information may include at least one of service information regarding a service type of the contents, page information regarding a webpage contained in the contents, or component information regarding components constituting the contents.

The content restriction information may include at least one of information regarding a service the display of which is restricted, information regarding a webpage the display of which is restricted, or information regarding components the display of which is restricted.

The content restriction information may include information regarding driving restrictions.

The acquiring of the content restriction information may include receiving the content restriction information on the basis of positional information of an automotive electronic device.

The determining of the displayable portion in the contents comprises determining at least a partial region of the contents as a displayable portion, and determining at least a partial region of the contents as an undisplayable portion.

The displaying may include displaying only the region determined as the displayable portion in the contents.

The displaying may include restricting the display of the region determined as the undisplayable portion in the contents.

An automotive electronic device may include: a vehicle content receiving unit receiving vehicle contents including contents and meta information regarding the contents; a content restriction information acquisition unit acquiring content restriction information; a controller determining a displayable portion in the contents on the basis of the meta information, the content restriction information and vehicle travel information; and a display unit displaying contents of the determined displayable portion.

The display unit may include a plurality of display units, and at least one of the plurality of display units may restrict the display of a region determined as an undisplayable portion in the contents.

A system for displaying vehicle contents may include: a contents integration server receiving contents from a service provision server, acquiring meta information regarding the received contents, and acquiring vehicle contents which can be displayed on a web browser and include the received contents and the acquired meta information; and an automotive electronic device receiving the vehicle contents from the contents integration serve, acquiring content restriction information, determining a displayable portion in the contents on the basis of at least one of the meta information, the content restriction information, or vehicle travel information, and displaying contents of the determined displayable portion.

According to the disclosure of this specification, the aforementioned problems of the prior art are solved.

In particular, according to the disclosure of this specification, a user can be provided with an automotive electronic device that maintains the up-to-date functionality and eliminates the need for further update.

Moreover, according to the disclosure of this specification, a user can be provided with an automotive electronic device that provides contents complying with local driving restrictions.

Also, according to the disclosure of this specification, a user can be provided with an automotive electronic device that can provide a UI suited to the features of a cloud service.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

In the following description, the technical terms herein are used only for explaining a specific exemplary embodiment without limiting the present invention. Unless otherwise defined, all the technical terms used herein have the same meaning as commonly understood by one of ordinary skill in the art to which this invention belongs, and will not be interpreted in an overly narrowed or widened sense. Furthermore, in the case that technical terms used herein are inappropriate and thus fail to correctly express the spirit of the present invention, these terms should be construed by substituting them with technical terms leading to correct understandings of one of ordinary skill in the art. The generic terms used herein should be understood in the context of this specification according to definitions found in dictionaries, and will not be interpreted in a too narrow sense.

As used herein, the singular forms, "a," "an" and "the," are intended to include the plural forms as well, unless the context clearly indicates otherwise. Additionally, the terms, "includes," "including," "comprises" and "comprising," specify the presence of the stated elements or steps; however, these terms do not mean that all the state elements or steps should be necessarily included and do not also preclude the presence or addition of one or more other elements or steps.

Also, the terms, "module", "unit" and "part" are given or interchangeably used only for ease of description, and are not intended to distinguish one from another.

Although the terms, first, second, etc., may be used herein to describe various elements, these elements are not to be limited by these terms. These terms are simply used to distinguish one element from another. Thus, a first element, discussed below, could be termed a second element without departing from the teachings of the exemplary embodiments.

Description will now be given in detail of the exemplary embodiments, with reference to the accompanying drawings. For the sake of brief description with reference to the drawings, the same or equivalent components will be provided with the same reference numbers, and description thereof will not be repeated.

Moreover, detailed descriptions related to well-known functions or configurations will be omitted in order not to unnecessarily obscure the subject matters of the present invention. In addition, it will be understood that the accompanying drawings are intended to help in understanding the spirit of the present invention and not in any way to limit the invention.

Examples of an automotive electronic device described in this specification may include a head unit, a multimedia device installed within a vehicle, an internet access terminal, a digital broadcasting terminal, a navigation and the like.

Figure 1:
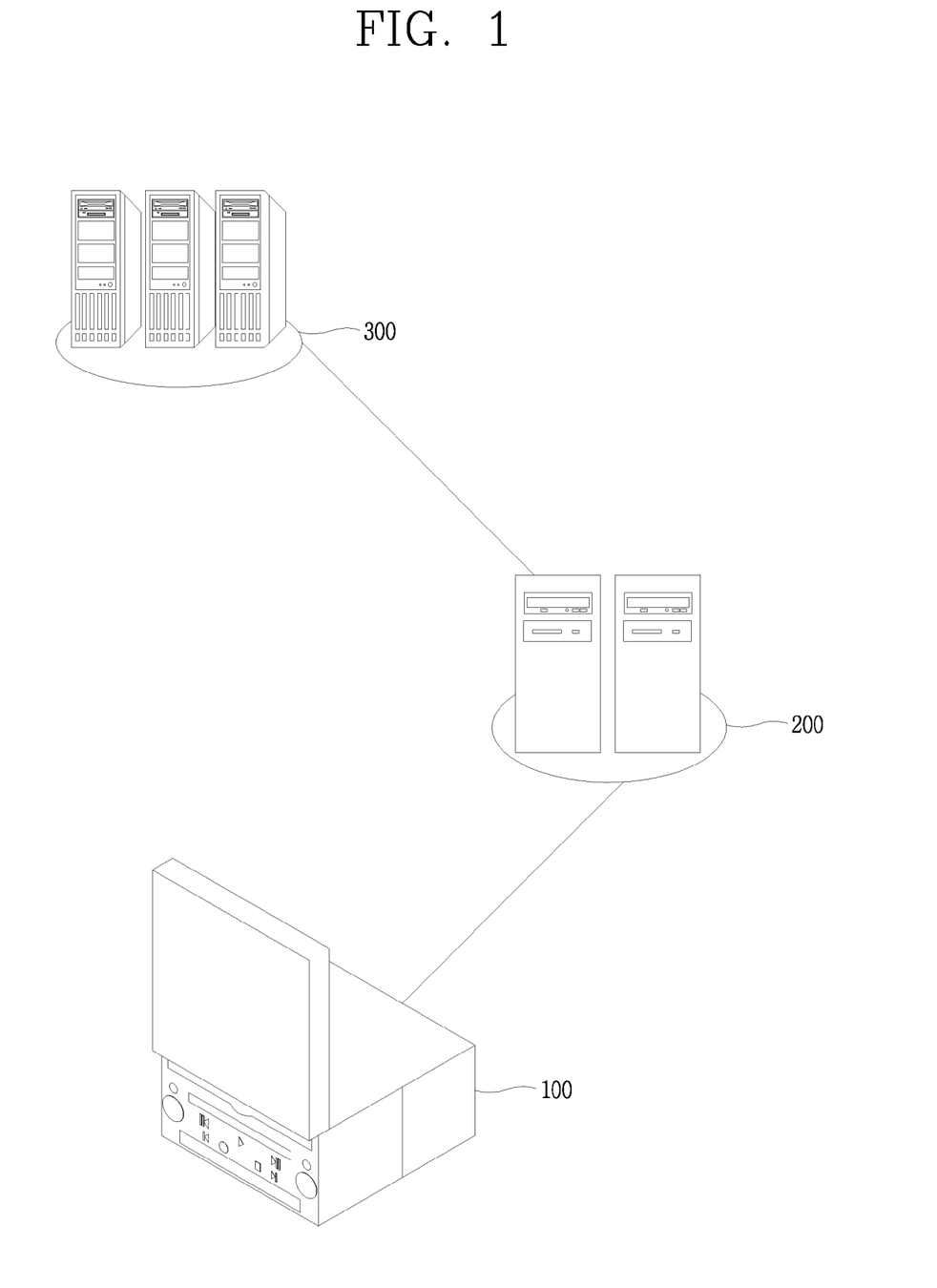
FIG. 1 is a conceptual view illustrating a system for displaying vehicle contents according to an embodiment disclosed in the present application.

FIG. 1

FIG. 1 is a conceptual view illustrating a system for displaying vehicle contents according to an embodiment disclosed in this specification.

As shown in FIG. 1, the system may include a service provision server 300, a contents integration server 200, and an automotive electronic device 100.

The service provision server 300 described in this specification may include a server that provides various types of Internet service. Examples of the Internet services may include a social networking service (SNS), a video provision service, a broadcasting provision service, a guidance service, an e-mail service, a messenger service, and the like.

The contents integration server 200 may serve to process and deliver contents between the service provision server 300 and the automotive electronic device 100.

For example, the contents integration server 200 may request contents from the service provision server 300 or may receive contents from the service provision server 300. Here, the contents integration server may transmit and receive contents to and from the service provision server 300 using an open API of each Internet service.

Furthermore, the contents integration server 200 may acquire meta information regarding the received contents. For example, the contents integration server 200 may receive meta information regarding the received contents from the service provision server 300. In addition, the contents integration server 200 may acquire meta information regarding the received contents on the basis of the received contents.

The meta information may contain service type information regarding a service type of the contents, webpage information regarding a webpage contained in the contents, component information regarding HTML components constituting the contents, and the like.

The service type information refers to information on which type of service is associated with the contents. Examples of the service type information may include information on whether predetermined contents are provided from an e-mail service, a guidance service, a music service or the like.

The webpage information is information regarding which components are contained in a webpage in the contents. Examples of components that a predetermined web may contain include a text, a video, an image, a 3D graphic, a UI and the like.

The component information is information regarding an HTML component constituting the contents, that is, information that the contents integration server 200 can identify through an HTML. Examples of the component information include a title, a menu button, an image (img), a video, a text and the like.

Furthermore, the contents integration server 200 may acquire contents for a vehicle (hereinafter, "vehicle contents") using an HTML, a web script (e.g., a java script) or the like on the basis of the contents and the meta information. The vehicle contents are those that can be provided in the form of a web service.

In addition, the contents integration server 200 may provide the vehicle contents to the automotive electronic device 100 upon request of the automotive electronic device 100.

The automotive electronic device 100 may receive vehicle contents from the contents integration server 200 and display at least a partial region of the received vehicle contents.

For example, the automotive electronic device 100 may perform a user authentication procedure and access the contents integration server 200. In addition, the automotive electronic device 100 may deliver a request for contents to the contents integration server 200 and receive the vehicle contents.

Furthermore, the automotive electronic device 100 may acquire meta information from the received vehicle contents. The automotive electronic device 100 may also select a displayable portion (e.g. a portion or region allowed for display) and an undisplayable portion (e.g., a portion or region not allowed (i.e., restricted) for display) from the contents on the basis of the meta information and driving restriction information. In addition, the automotive electronic device 100 may display only a displayable portion on a display unit.

Figure 2:
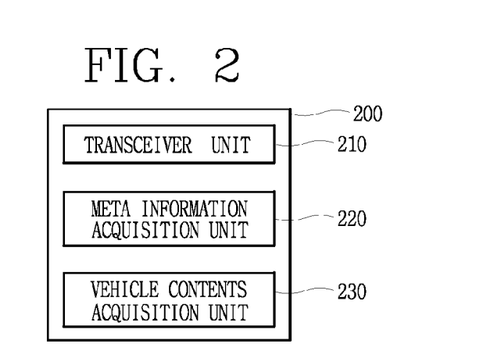
FIG. 2 is a block diagram illustrating a contents integration server according to an embodiment of the present invention.

FIG. 2

FIG. 2 is a block diagram illustrating a contents integration server 200 according to an embodiment of the present invention.

Referring to FIG. 2, the contents integration server 200 according to an embodiment of the present invention may include a transceiver unit 210, a meta information acquisition unit 220, a vehicle contents acquisition unit 230, and the like. Such components illustrated in FIG. 2 are not necessarily required, and the contents integration server with more or less components may therefore be implemented.

The transceiver unit 210 may exchange data with the automotive electronic device 100 and the service provision server 300. For example, the transceiver unit 210 may receive a request for contents from the automotive electronic device 100. The transceiver unit 210 may also send a request for contents to the service provision server 300 on the basis of the received request and may receive the requested contents from the service provision server 300. Also, the transceiver unit 210 may send vehicle contents to the automotive electronic device 100.

The meta information acquisition unit 220 may acquire meta information on the contents received by the contents integration server.

For example, the meta information acquisition unit 220 may identify information regarding a service type of the received contents, types of components constituting a webpage contained in the contents, and HTML components constituting the contents.

Instead of identifying the contents and acquiring meta information by the meta information acquisition unit 220, the transceiver unit 210 may receive meta information on the contents while receiving the contents from the service provision server 300.

Alternatively, the meta information acquisition unit 220 may acquire the meta information on the contents by using information contained in the contents received by the transceiver unit 210.

The vehicle contents acquisition unit 230 may acquire vehicle contents on the basis of the contents received by the contents integration server and the meta information on the contents. For example, the vehicle contents refer to contents that can be provided in the form of a web service based on an HTML, a web script (e.g., a java script) or the like. Also, the vehicle contents may include all of service information regarding contents, information regarding respective webpages constituting the contents, and information regarding respectively components constituting the contents.

Figure 3:
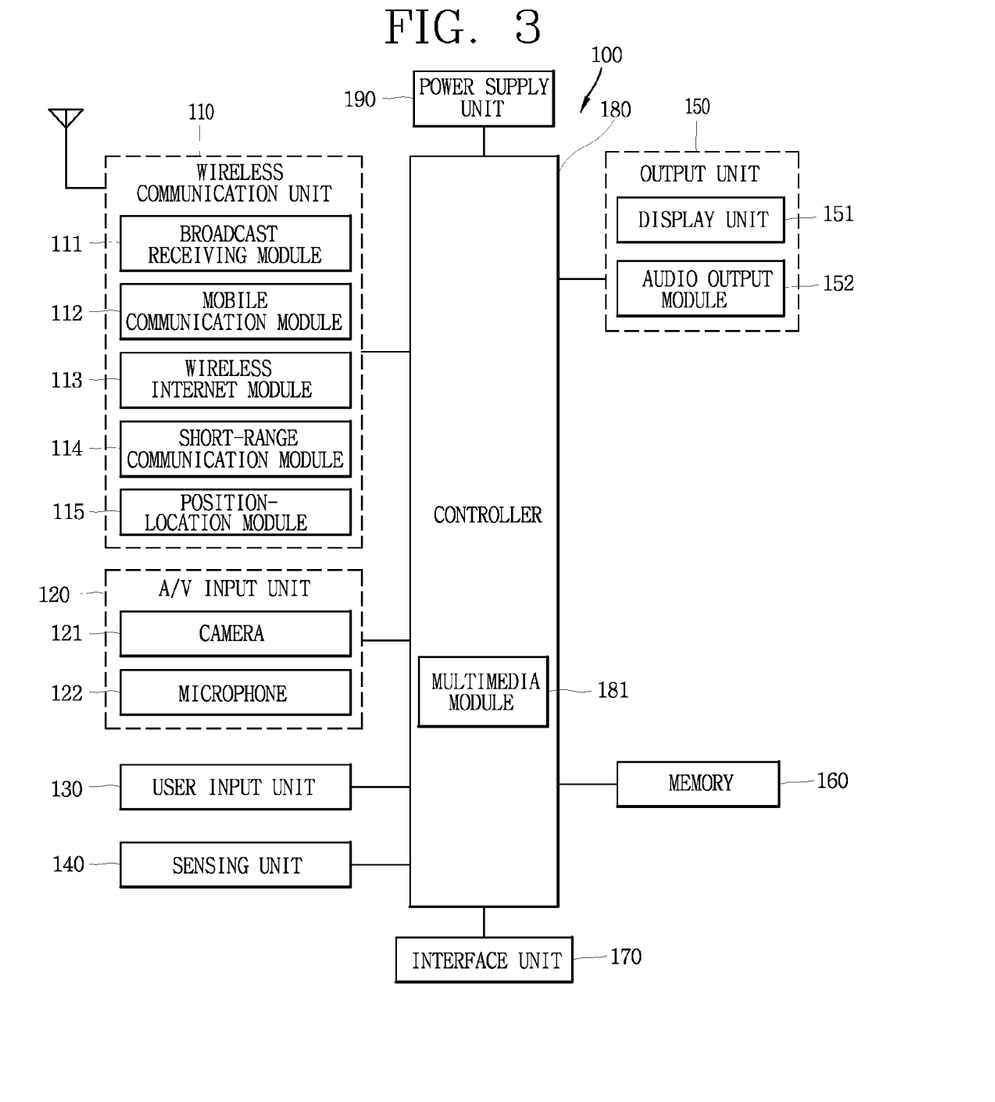
FIG. 3 is a block diagram illustrating an automotive electronic device according to an exemplary embodiment disclosed in the present application.

FIG. 3

FIG. 3 is a block diagram illustrating an automotive electronic device according to an embodiment disclosed in this specification.

The automotive electronic device 100 may include a wireless communication unit 110, an audio/video (A/V) input unit 120, a user input unit 130, an output unit 150, a memory 160, an interface unit 170, a controller 180, a power supply 190 and the like. However, these components shown in FIG. 3 are not necessarily required, and an automotive electronic device with more or less components may therefore be implemented.

The components will now be described in order.

The wireless communication unit 110 may include one or more modules enabling wireless communications between the automotive electronic device 100 and a wireless communication system. For example, the wireless communication unit 110 may include a broadcasting receiving module 111, a mobile communication module 112, a wireless Internet module 113, a short-range communication module 114, a positioning module 115, and the like.

The broadcasting receiving module 111 receives a broadcasting signal and/or broadcasting-related information from an external broadcasting management server via a broadcasting channel.

The broadcasting channel may include a satellite channel, a territorial channel or the like. The broadcasting management server may refer to a server that creates and sends a broadcasting signal and/or broadcasting-related information, or a server that receives a previously created broadcasting signal and/or broadcasting-related information and sends it to a terminal. The broadcasting signal may include a TV broadcasting signal, a radio broadcasting signal, and a data broadcasting signal, as well as a combined broadcasting signal in which a data broadcasting signal is combined with a TV broadcasting signal or a radio broadcasting signal.

The broadcasting-related information may refer to information regarding a broadcasting channel, a broadcasting program or a broadcasting service provider. The broadcasting-related information may be provided even via a mobile communication network, in which case the information may be received by the mobile communication module 112.

The broadcasting-related information may take various forms, such as EPG (Electronic Program Guide) of DMB (Digital Media Broadcasting), ESG (Electronic Service Guide) of DVB-H (Digital Video Broadcast-Handheld), or the like.

The broadcasting receiving module 111 may receive a digital broadcasting signal using a digital broadcasting system such as DMB-T (Digital Multimedia Broadcasting-Terrestrial), DMB-S (Digital Multimedia Broadcasting-Satellite), MediaFLO (Media Forward Link Only), DVB-H (Digital Video Broadcast-Handheld), ISDB-T (Integrated Services Digital Broadcast-Terrestrial) or the like. Of course, the broadcasting receiving module 111 may also be adapted to broadcasting systems other than the aforementioned digital broadcasting system.

The received broadcasting signal and/or broadcasting-related information received through the broadcasting receiving module 111 may be stored in the memory 160.

The mobile communication module 112 exchange a radio signal with at least one of a base station, an external terminal or a server on a mobile communications network. The radio signal may include a voice call signal, a video call signal, or data in various forms according to the transmission and/or reception of a text/multimedia message.

The mobile communication module 112 is configured to implement a video call mode and a voice call mode. The video call mode refers to a communication condition providing the other party's real-time image during a call, and the voice call mode refers to a communication condition providing no video during a call. In order to implement the video call mode and the voice call mode, the mobile communication module 112 is configured to transmit/receive a voice and/or an image.

The wireless Internet module 113 refers to a module for wireless Internet access and may be built in the automotive electronic device 100 or be mounted externally. As for a wireless Internet scheme, WLAN (Wireless LAN) (Wi-Fi), Wibro (Wireless broadband), Wimax (World Interoperability for Microwave Access), HSDPA (High Speed Downlink Packet Access) or the like may be used.

The short-range communication module 114 refers to a module for short-range communications. As for a short-range communication scheme, Bluetooth, RFID (Radio Frequency Identification), Infrared Data Association (IrDA), UWB (Ultra Wideband), ZigBee or the like may be used.

The positioning module 115 is a module for acquiring positional information of the automotive electronic device, and a respective example of the positioning module is a GPS (Global Position System) module.

Referring to FIG. 3, the A/V (Audio/Video) input unit 120 is for input of an audio signal or a video signal, and may include a camera 121, a mike 122 or the like. The camera 121 processes an image frame such as a still image, a video or the like obtained by an image sensor in the video call mode or a photographing mode. The processed image frame may be displayed on the display unit 151.

The image frame processed in the camera 121 may be stored in the memory 160 or transmitted to the outside through the wireless communication unit 110. The camera 121 may be provided as two or more cameras according to a user environment.

The mike 122 receives an outside audio signal by a microphone in a communication mode, a recording mode, a voice recognition mode or the like and processes it into an electric voice data. In the case of a call mode, the processed voice data may be converted into a form transmittable to a mobile communication base station through the mobile communication module 112 and then be output. Various noise removal algorithms may be implemented in the mike 122 in order to remove noise generated while an outside audio signal is being input.

The user input unit 130 generates input data input by a user in order to control the operation of an electronic device. The user input unit 130 may be configured as a key pad, a dome switch, a touch pad (static pressure/static electricity), a jog wheel, a jog switch, or the like.

The output unit 150 is to generate output associated with visual, auditory or tactile sense or the like, and may include the display unit 151, a sound output module 152 and the like.

The display unit 151 displays (outputs) information processed in the automotive electronic device 100. Also, the display unit 151 may select and display only displayable contents. The display unit 151 may also restrict the display of a partial region determined to be undisplayable in the contents.

The display unit 151 may include at least one of an LCD (liquid crystal display), a TFT LCD (thin film transistor-liquid crystal display), an OLED (organic light-emitting diode), a flexible display, a 3D display, or an e-ink display.

According to the implemented form of the automotive electronic device 100, two or more display units 152 may exist. For example, the automotive electronic device 100 may be provided with a plurality of display units disposed individually with a spacing therebetween.

If the display unit 151 and a sensor that detects a touch action (hereinafter, referred to as a "touch sensor") are in a mutually-layered structure (hereinafter, referred to as a "touch screen"), the display unit 151 may also be used as an input device as well as an output device. The touch sensor may be configured in various forms such as a touch film, a touch sheet, a touch pad or the like.

The touch sensor may be configured to convert to an electric input signal a change in pressure applied to a specific zone of the display unit 151, capacitance generated in a specific zone of the display unit 151 or the like. The touch sensor may be configured to detect even touch pressure as well as the location and area of a touch.

In the case that touch input is made for a touch sensor, a corresponding signal(s) is sent to a touch controller. The touch controller processes this signal(s) and then sends corresponding data to the controller 180. By using so, the controller 180 can learn which part of the display unit 151 has been touched and so on.

The sound output module 152 may output audio data stored in the memory 150 or received from the wireless communication unit 110 in a call signal reception mode, a call mode, a recording mode, a voice recognition mode, a broadcasting receiving mode or the like. The sound output module 152 may output a sound signal associated with a function performed in the automotive electronic device 100. Such a sound output module 152 may include a receiver, a speaker, a buzzer, or the like.

The memory 160 may store a program for the operation of the controller 180 and may temporarily store data (e.g., driving restriction information, etc.) being input/output. The memory 160 may store data regarding vibration and sounds of various patterns being output when touch input is made on the touch screen.

The memory 160 may include at least one type of storage medium from among a flash memory type, a hard disk type, a multimedia card micro type, a card type memory (e.g., an SD memory, an XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disc and an optical disc. The automotive electronic device 100 may operate in association with a web storage performing a storage function of the memory 160 on Internet.

The interface unit 170 serve as a channel with every external device connected to the automotive electronic device 100. The interface unit 170 receives data from an external device, receive power to send it to each component within the automotive electronic device 100, or transmit data in the automotive electronic device 100 to an external device. Examples of the interface unit 170 may include a port, an audio I/O (Input/Output) port, a video I/O (Input/Output) port, an earphone port or the like for connection with a device equipped with a wired/wireless headset port, an external charger port, a wired/wireless data port, a memory card port and an identification module.

Furthermore, the automotive electronic device 100 may acquire vehicle travel information through the interface unit 170. The vehicle travel information is information indicating the travel state of the vehicle. For example, the vehicle travel information may include information regarding whether the vehicle is running or is stopped or parked.

The identification module is a chip that stores various information used to authenticate the authority for the automotive electronic device 100, and may include a UIM (user identify module), an SIM (subscriber identify module), a USIM (Universal subscriber identity module), or the like. A device equipped with such an identification module (hereinafter, an "identification device") may be fabricated in the form of a smart card. Thus, the identification device may be connected to a terminal 100 through a port.

The controller 180 generally controls the overall operation of the automotive electronic device, and performs control and processing associated with, for example, a cloud service display, etc. The controller 180 may include a multimedia module 180 for multimedia replay. The multimedia module 181 may be implemented into the controller 180 or may be implemented separately from the controller 180.

Furthermore, the controller 180 may, based on driving restriction information and meta information, select displayable and undisplayable portions from the vehicle contents received by the automotive electronic device.

A method of acquiring vehicle contents by a contents integration server will now be described with reference to FIG. 4.

Figure 4:
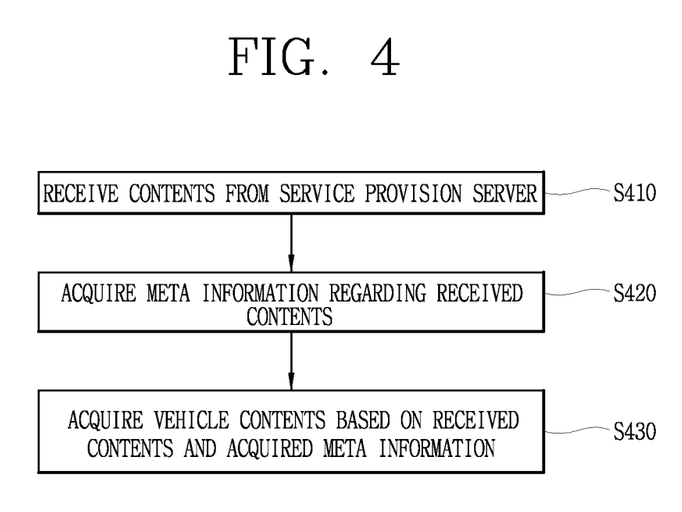
FIG. 4 is a flowchart illustrating a method of acquiring vehicle contents according to an embodiment of the present invention.

FIG. 4.

FIG. 4 is a flowchart illustrating a method of acquiring vehicle contents according to an embodiment of the present invention.

First, referring to FIG. 4, the transceiver unit 210 may receive contents from a service provision server 300 (S410).

For example, the transceiver unit 210 may receive a transmission request for predetermined contents from the automotive electronic device 100. The transceiver unit 210 may, based on the transmission request, send a transmission request for the predetermined contents to the predetermined service provision server 300 and receive the predetermined contents from the service provision server 300.

Alternatively, a web service that a user frequently uses may be stored in the memory 160 in advance. In this case, the transceiver unit 210 may periodically receive contents regarding the pre-stored web service from the service provision server 300.

As the contents integration server 200 periodically updates data regarding a web service as described above, the automotive electronic device 100 can be provided with the latest service all the time.

According to an embodiment of the present invention, the contents integration server 200 may be provided with respective contents through an open API of various current cloud services (e.g., Facebook, Twitter, Pandora, etc.).

According to an embodiment of the present invention, the meta information acquisition unit may acquire meta information regarding the received contents (S420).

Figure 5A:
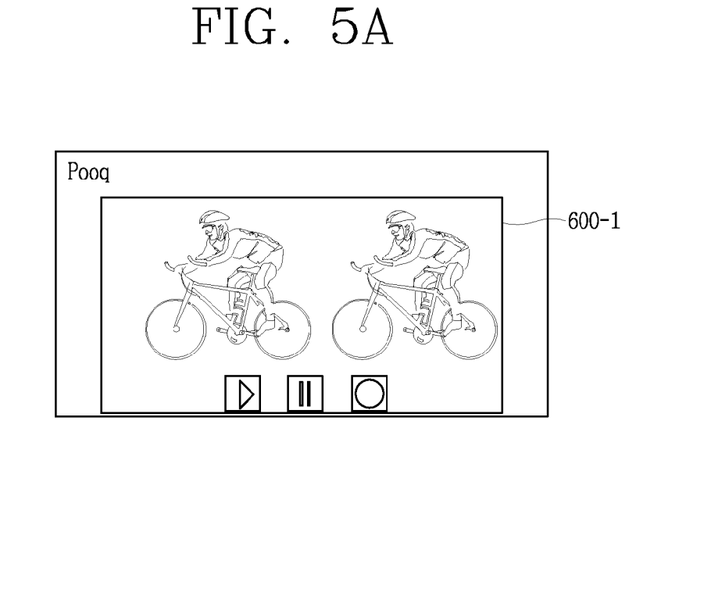
FIGS. 5A, 5B and 5C are views for describing meta information according to an embodiment of the present invention.
Figure 5B:
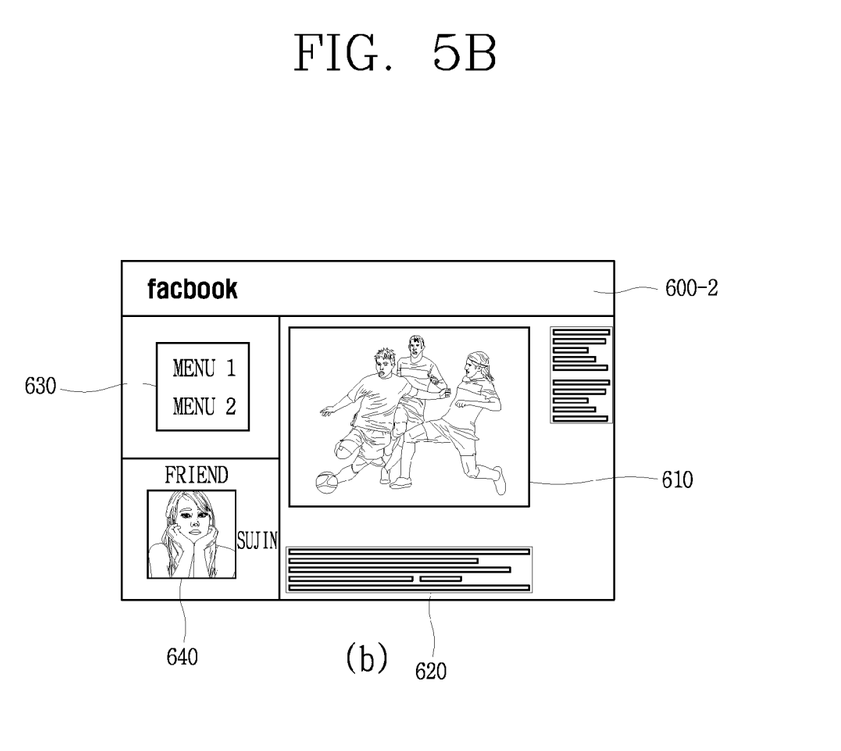
Figure 5C:
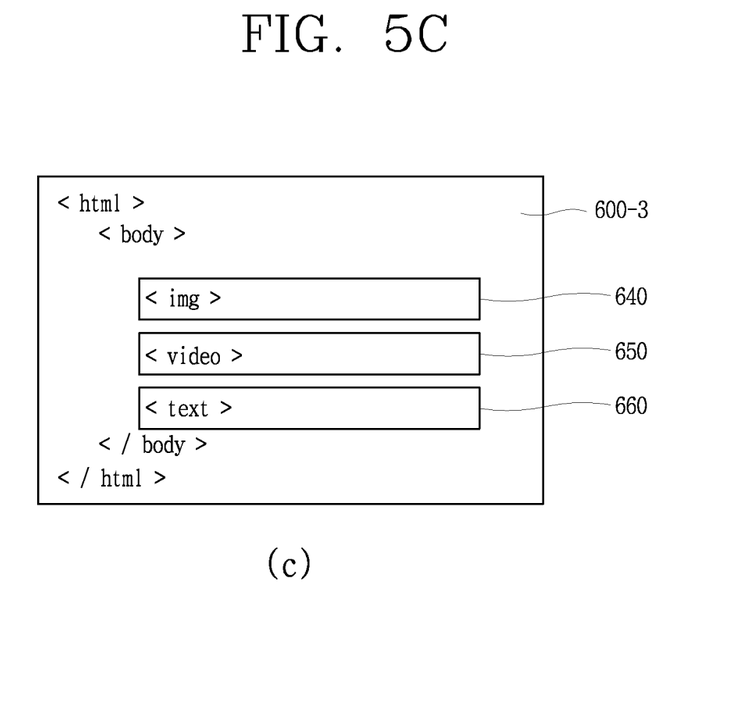

FIGS. 5A, 5B and 5C

FIGS. 5A, 5B and 5C are views for describing meta information according to an embodiment of the present invention.

The meta information may contain a service type of received contents, information regarding components constituting a webpage contained in the contents, and information regarding HTML components constituting the contents.

FIG. 5A is a view illustrating an example of contents acquired by the contents integration server.

Contents 600-1 illustrated in FIG. 5A are contents provided by a video provision service. In this case, the meta information acquisition unit 220 may acquire information indicating that the contents relate to a video service.

FIG. 5B is a view illustrating another example of contents acquired by the contents integration server.

Contents 600-2 illustrated in FIG. 5B are contents provided by an SNS service. In this case, the meta information acquisition unit 220 may acquire information indicating the contents relate to an SNS service.

Furthermore, the contents 600-2 contain a webpage, and the webpage may be constituted by predetermined components 610, 620, 630 and 640.

The component 610 is a video, the component 620 is a text, the component 630 is a UI, and the component 640 is an image.

In this case, the meta information acquisition unit 220 may acquire information regarding a component constituting the webpage.

FIG. 5C is a view illustrating another example of contents acquired by the contents integration server.

Contents 600-3 illustrated in FIG. 5C are contents provided by any cloud service.

The contents may be presented in an HTML format. In this case, the meta information acquisition unit 220 may acquire HTML components 640, 650 and 660 constituting contents on the basis of the HTML page.

For example, the component 640 is an image, the component 650 is a video, and the component 660 is a text.

In this case, the meta information acquisition unit 220 may acquire information regarding HTML components constituting the webpage.

The meta information acquisition unit 220 may acquire meta information by determining contents, or may receive meta information regarding contents while receiving the contents from the service provision server 300.

Thus, the contents integration server 200 may acquire predetermined contents and meta information regarding the contents. The meta information may contain the purpose of use of the contents, and the type and configuration of the contents.

The meta information may contain information on which type of cloud service the contents relate to, which type of components the webpage in the contents includes, or which components the HTML format of the contents includes.

According to an embodiment of the present invention, the vehicle contents acquisition unit may acquire vehicle contents on the basis of the received contents and the acquired meta information (S430).

The vehicle contents refer to contents in which the meta information has been added to the contents received from the service provision server 300 by the contents integration server 200.

In particular, the vehicle contents acquisition unit may apply the meta information depending on the contents.

Referring to FIG. 5, the meta information includes information regarding a service type of the received contents, components constituting the webpage contained in the contents, and information regarding HTML components constituting the contents. Accordingly, the automotive electronic device 100 can recognize various types of information of the contents from the vehicle contents.

The vehicle contents may preferably be configured as contents that can be provided in the form of a web service. This is because it is preferable that the automotive electronic device 100 receiving the vehicle contents displays the vehicle contents using a web browser.

In this way, the automotive electronic device can acquire the up-to-date information using the contents in the form of a web service without the need for additional update.

Furthermore, the vehicle contents may be properly processed according to a user's need or the like.

Figure 6:
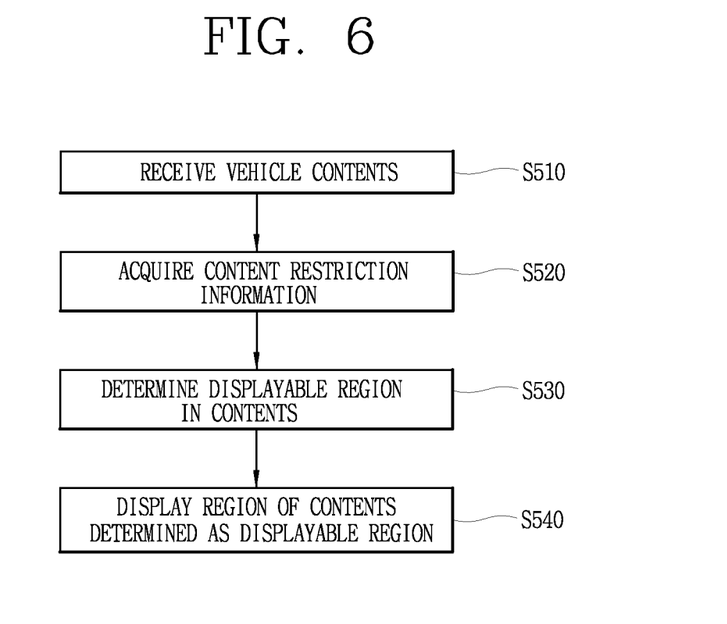
FIG. 6 is a flowchart illustrating a method of displaying vehicle contents according to an embodiment of the present invention.

FIG. 6

FIG. 6 is a flowchart illustrating a method of displaying vehicle contents according to an embodiment of the present invention.

Referring to FIG. 6, the wireless communication unit 110 may receive vehicle contents (S510).

In addition, according to an embodiment of the present invention, the automotive electronic device 100 may acquire content restriction information (S520).

The content restriction information may contain information regarding an object that is not allowed for display on the automotive electronic device while a vehicle is traveling. For example, the content restriction information may include information regarding services that are not allowed for display during traveling, information regarding webpage components that are not allowed for display during traveling, information regarding HTML components that are not allowed for display during traveling, and the like.

In particular, in a certain country, video display may be restricted during traveling of a vehicle. In a certain country, the display of texts smaller than a predetermined font size during traveling may be restricted. Also, in a certain country, the execution of a game program in an automotive electronic device during traveling may be restricted.

Information regarding restriction regulations by countries or provinces is herein referred to as information.

According to an embodiment of the present invention, the wireless communications unit 110 may receive the content restriction information. For example, based on positional information from the positioning module 115, the wireless communication unit 110 may receive content restriction information corresponding to the positional information. The wireless communications unit 110 may receive driving restrictions of a country where the automotive electronic device is located.

Alternatively, the content restriction information may be stored in the memory 160 or the automotive electronic device 100 may receive the content restriction information via the interface unit 170. Alternatively, the content restriction information may be input through the user input unit 130.

Also, according to an embodiment of the present invention, the controller 180 may determine a displayable portion (i.e., a region allowed for display) of the contents based on the meta information, the content restriction information, vehicle travel information, etc. (S530).

The vehicle travel information may contain information regarding whether or not a vehicle is traveling. For example, if the vehicle is in a parked state, there is no need to restrict the replay of certain contents by the content restriction information. Therefore, when a displayable portion of contents is determined, the vehicle travel information needs to be considered.

The vehicle travel information may be acquired through the interface unit 170, the wireless communications unit 110, or the like.

In particular, the case where video display is banned according to the content restriction information will now be described.

The controller 180 may restrict the display of predetermined contents based on the meta information. In particular, the controller 180 may restrict at least a partial region of the contents based on service information, webpage information, HTML component information contained in the meta information.

For example, if meta information on predetermined contents contains information indicating the predetermined contents relate to a video streaming service, the controller may restrict the display of the contents.

Furthermore, if meta information on predetermined contents contains information indicating that at least one of webpage components contained in the contents is a video, the controller may restrict the display of the video region of the contents.

Also, if meta information on predetermined contents contains information indicating that the HTML components of the contents include a video, the controller may restrict the display of the video region of the contents.

As described above, in the case that at least one of service information, webpage information and HTML component information contained in meta information corresponds to the content restriction information, the controller may determine the contents of the corresponding regions restricted for display.

Also, the controller 180 may initially determine a restricted region based on the service information contained in the meta information, then determine a restricted region based on the webpage information contained in the meta information, and then determine a restricted region based on the HTML component information contained in the meta information. By this order, the controller 180 can efficiently determine the restricted region of the contents.

Referring to FIG. 5B, if the content restriction information restricts video display, the controller 180 may restrict the display of the region 610 of the contents 600-2, the region 610 displaying a video.

Also, according to an embodiment of the present invention, the display unit 151 may display a partial region of the contents, the region determined to be displayable (S540). The displayable portion corresponds to the contents other than the region that has been determined restricted for display.

In particular, according to an embodiment of the present invention, the display unit 151 may only display a partial region of the contents, the region determined to be displayable.

Figure 7A:
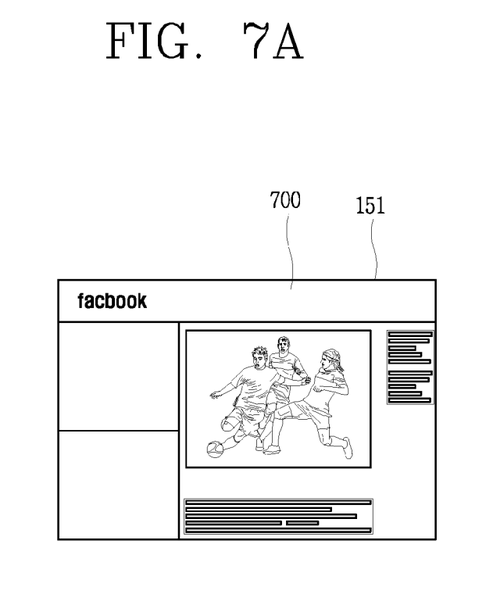
FIGS. 7A and 7B are views for describing a display unit of an automotive electronic device employing a method of displaying vehicle contents according to an embodiment of the present invention.
Figure 7B:
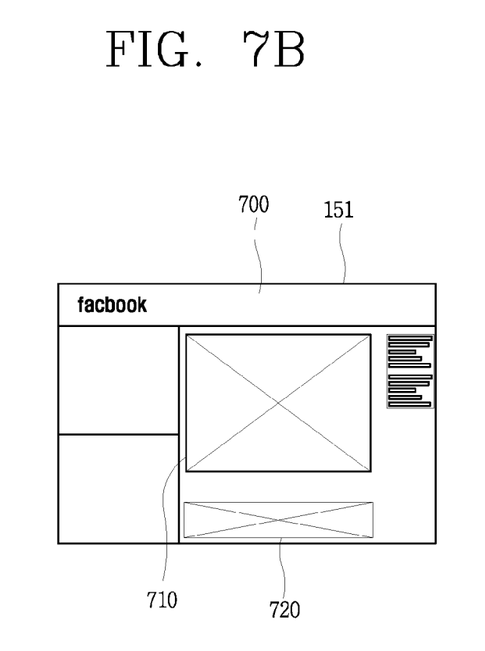

FIGS. 7A and 7B

FIGS. 7A and 7B are views for describing the display unit of the automotive electronic device employing a method of displaying vehicle contents according to an embodiment of the present invention.

In FIG. 7A, the automotive electronic device displays the whole contents.

As described above, the controller 180 may determine the displayable portion of contents based on the contents, meta information on the contents, content restriction information and vehicle travel information.

According to an embodiment of the present invention, the controller 180 may determine a partial region in predetermined contents 700 that displays a video and another partial region that displays a text 720 not greater than a predetermined font size to be restricted and so undisplayable.

As shown in FIG. 7B, when the regions 710 and 720 of the vehicle contents are determined to be undisplayable, the display unit 161 of the automotive electronic device 100 may display the contents other than the regions determined to be restricted and so undisplayable.

By such a method, the automotive electronic device 100 may provide a user with contents complying with local driving restrictions.

Figure 8:
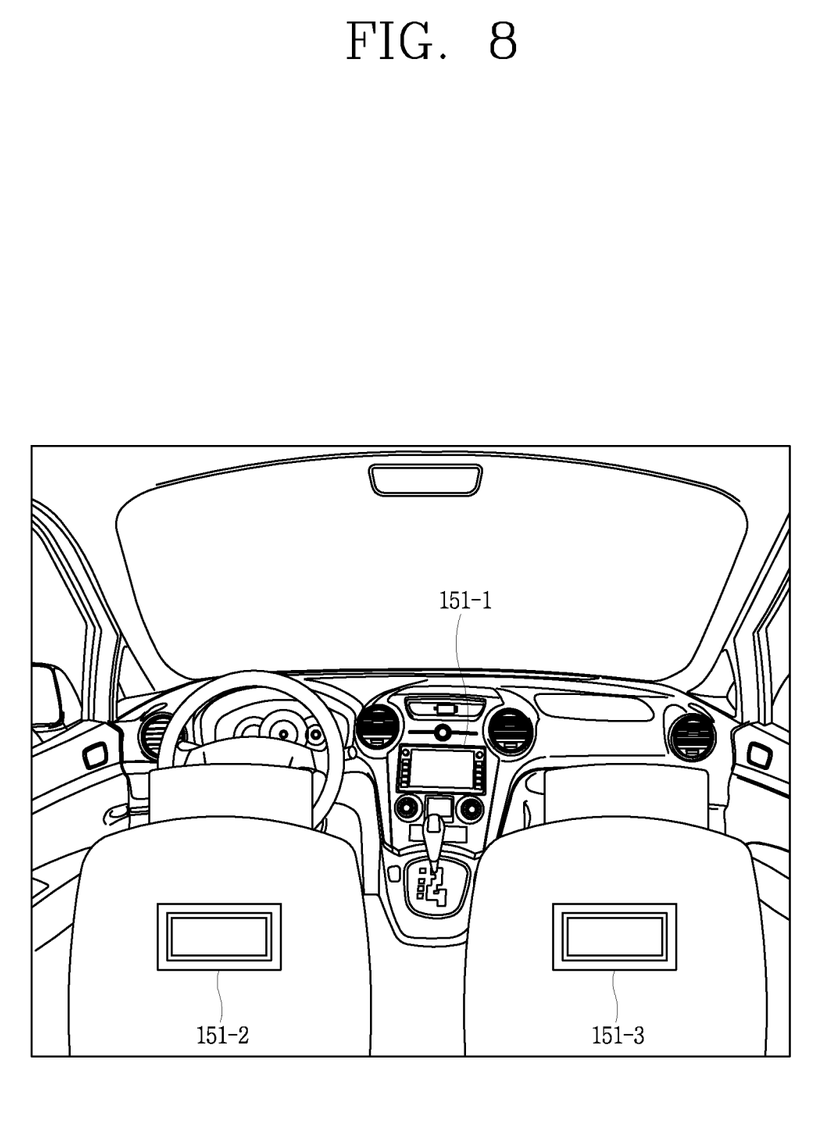
FIG. 8 is a view for describing a display unit of an automotive electronic device employing a method of displaying vehicle contents according to another embodiment of the present invention.

FIG. 8

FIG. 8 is a view for describing the display unit of the automotive electronic device employing a method of displaying vehicle contents according to another embodiment of the present invention.

The automotive electronic device 100 may include a plurality of display units 151.

For example, as shown in FIG. 8, the automotive electronic device 100 may include one display unit 151-1 in front of a driver's seat, and two respective display units 151-2 and 152-3 in front of back seats.

In this case, only the display unit 151-1 in the front is affected by driving restrictions.

Thus, only the display unit 151-1 is limited in display by the method of displaying vehicle contents, while the two other display units 151-2 and 151-3 may display the whole contents without any restriction.

The methods according to the above embodiments of the present invention may be utilized separately or in combination. Also, the steps of each embodiment may be used separately from or in combination with those of another embodiment.

The methods described above may also be implemented in a recording medium that is readable by a computer or the like using software, hardware or the combination thereof.

According to hardware implementation, the above methods may be realized using at least one of ASICs (application specific integrated circuits), DSPs (digital signal processors), DSPDs (digital signal processing devices), PLDs (programmable logic devices), FPGAs (field programmable gate arrays, processors, controllers, micro-controllers, microprocessors, and electronic units for other functions.

According to software implementation, the procedures and functions described in this specification may be implemented as discrete software modules. These software modules may be configured as software codes written in suitable program languages, and the software codes may be stored in a storage or executed by a processor.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A method of a contents integration server for communicating vehicle contents, the method comprising:
   receiving contents from a service provision server;
   acquiring meta information on the received contents;
   acquiring vehicle contents displayable on a web browser based on the received contents and the acquired meta information; and
   transmitting the vehicle contents to an automotive electronic device, wherein the automotive electronic device including a plurality of display devices is configured to:
   receive the vehicle contents from the contents integration server;
   acquire content restriction information of the automotive electronic device, wherein the content restriction information comprises information regarding driving restrictions of a region where the automotive electronic device is located and information regarding an object that is not allowed for display on the automotive electronic device while a vehicle comprising the automotive electronic device is traveling in the region;
   determine a displayable portion in the contents based on the meta information, the content restriction information, and vehicle travel information, wherein the vehicle travel information comprises information regarding whether or not the vehicle comprising the automotive electronic device is traveling; and
   display on the plurality of display devices the displayable portion;
   wherein a display device on a driver's side among the plurality of display devices restricts the display of a region determined as an undisplayable portion in the contents, and
   wherein a display device on a rear seat's side among the plurality of display devices displays whole contents without any restriction when the display device on the driver's side restricts the display of the region.

2. The method of claim 1, wherein the receiving of the contents comprises:
   receiving a request for contents from the automotive electronic device;
   transmitting the request for the contents to the service provision server; and
   receiving the requested contents from the service provision server.

3. The method of claim 1, wherein the receiving of the contents comprises receiving contents regarding a preset web service at predetermined time intervals.

4. The method of claim 1, wherein the acquiring of the meta information comprises receiving the meta information regarding the received contents from the service provision server.

5. The method of claim 1, wherein the meta information includes at least one of service information regarding a service type of the contents, page information regarding a webpage contained in the contents, or component information regarding components constituting the contents.

6. A method of an automotive electronic device including a plurality of display devices of a vehicle for displaying vehicle contents, the method comprising:
   receiving vehicle contents including contents and meta information associated with the contents from a contents integration server, wherein the contents integration server receives the contents from a service provision server, acquires the meta information on the received contents, and acquires the vehicle contents displayable on a web browser based on the received contents and the acquired meta information;
   acquiring content restriction information of the automotive electronic device, wherein the content restriction information comprises information regarding driving restrictions of a region where the automotive electronic device is located and information regarding an object that is not allowed for display on the automotive electronic device while the vehicle is traveling in the region;
   determining a displayable portion in the contents based on the meta information, the content restriction information, and vehicle travel information, wherein the vehicle travel information comprises information regarding whether or not the vehicle is traveling; and
   displaying on the plurality of display devices the displayable portion;
   wherein a display device on a driver's side among the plurality of display devices restricts the display of a region determined as an undisplayable portion in the contents, and
   wherein a display device on a rear seat's side among the plurality of display devices displays whole contents without any restriction when the display device on the driver's side restricts the display of the region.

7. The method of claim 6, wherein the vehicle contents can be displayed on a web browser.

8. The method of claim 6, wherein the meta information includes at least one of service information regarding a service type of the contents, page information regarding a webpage contained in the contents, or component information regarding components constituting the contents.

9. The method of claim 6, wherein the determining of the displayable portion in the contents comprises determining at least a partial portion of the contents as the displayable portion, and determining at least a partial region of the contents as an undisplayable portion.

10. The method of claim 9, wherein the displaying comprises restricting a display of the at least the partial region determined as the undisplayable portion in the contents.

11. An automotive electronic device for a vehicle, comprising:
    a plurality of displays;
    a wireless communication unit; and
    a controller configured to:
    receive vehicle contents including contents and meta information associated with the contents via the wireless communication unit;
    acquire content restriction information of the vehicle, wherein the content restriction information comprises information regarding driving restrictions of a region where the vehicle is located and information regarding an object that is not allowed for display on the automotive electronic device while the vehicle is traveling in the region;
    determine a displayable portion in the contents based on the meta information, the content restriction information, and vehicle travel information, wherein the vehicle travel information comprises information regarding whether or not the vehicle is traveling; and display on the plurality of displays only the displayable portion, wherein a display on a driver's side among the plurality of displays restricts the display of a region determined as an undisplayable portion in the contents, and wherein a display on a rear seat's side among the plurality of displays displays whole contents without any restriction when the display on the driver's side restricts the display of the region.

12. A system for displaying vehicle contents, the system comprising:

a contents integration server configured to receive contents from a service provision server, acquire meta information regarding the received contents, and acquire vehicle contents which can be displayed on a web browser based on the received contents and the acquired meta information; and an automotive electronic device configured to receive the vehicle contents from the contents integration serve, acquire content restriction information of the automotive electronic device, wherein the content restriction information comprises information regarding driving restrictions of a region where the automotive electronic device is located and information regarding an object that is not allowed for display on the automotive electronic device while a vehicle comprising the automotive electronic device is traveling in the region, determine a displayable portion in the contents based on the meta information, the content restriction information, and vehicle travel information, wherein the vehicle travel information comprises information regarding whether or not the vehicle is travelling, and display on a plurality of display devices the displayable portion, wherein a display device on a driver's side among the plurality of display devices restricts the display of a region determined as an undisplayable portion in the contents, and wherein a display device on a rear seat's side among the plurality of display devices displays whole contents without any restriction when the display device on the a driver's side restricts the display of the region.

* * * * *